UNITED STATES PATENT OFFICE.

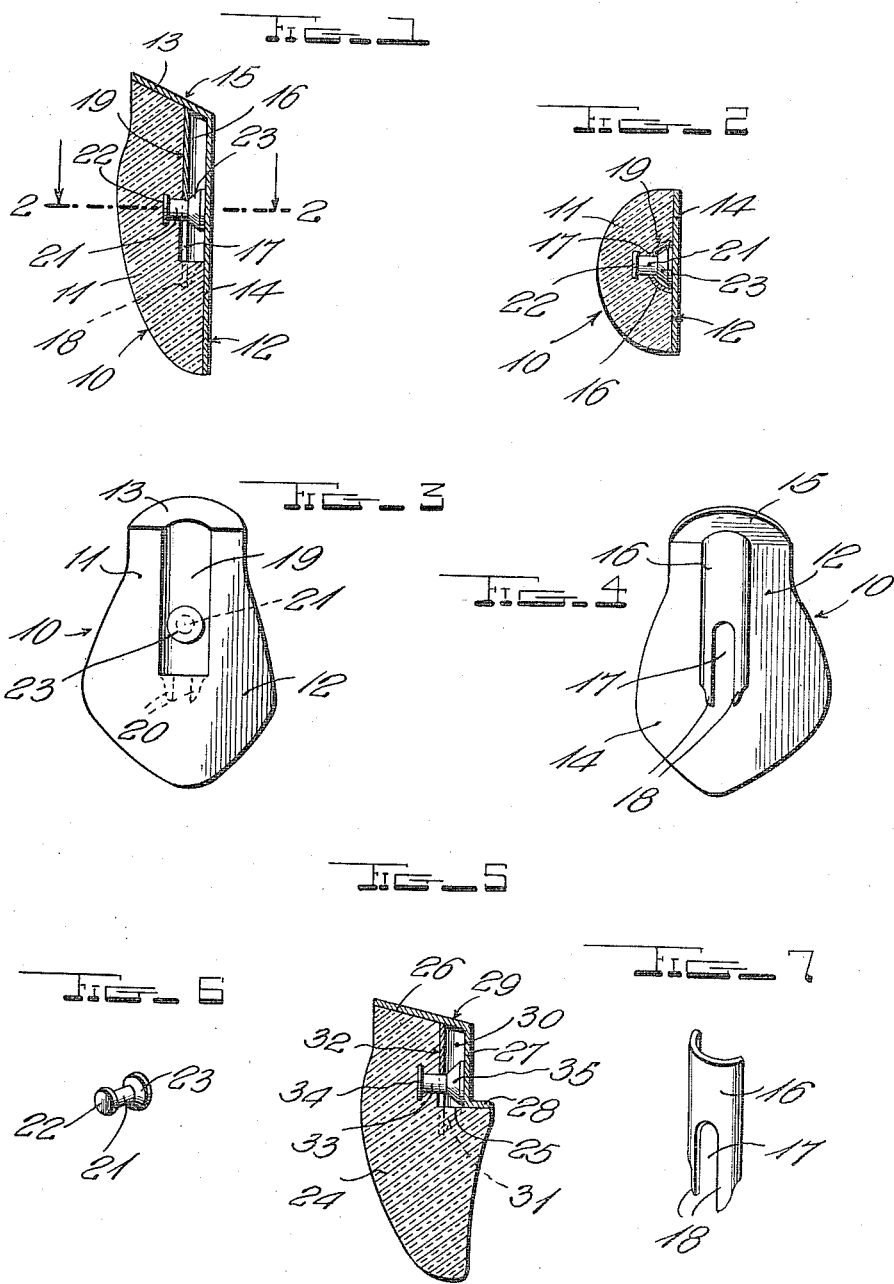

WILLIAM R. PHELPS, OF MILFORD, DELAWARE.

ARTIFICIAL TOOTH.

1,296,846.   Specification of Letters Patent.   Patented Mar. 11, 1919.

Application filed April 25, 1918. Serial No. 230,728.

*To all whom it may concern:*

Be it known that I, WILLIAM R. PHELPS, a citizen of the United States, residing at Milford, in the county of Sussex and State of Delaware, have invented certain new and useful Improvements in Artificial Teeth, of which the following is a specification.

My invention relates to improvements in artificial teeth, and has particular reference to the means for securing the backing to the porcelain tooth or crown.

An important object of the invention is to provide means of the above mentioned character, whereby, in the event that the porcelain tooth or crown should break, work loose or the like, the same may be removed and a new tooth or crown secured to the backing plate, without disturbing the other work.

A further object of the invention is to provide means of the above mentioned character which are simple in construction, cheap to manufacture, strong and durable.

Other objects and advantages of the invention will be apparent during the course of the following description.

In the accompanying drawings forming a part of this specification and in which like numerals are employed to designate like parts throughout the same, Figure 1 is a central vertical longitudinal sectional view through a tooth embodying my invention.

Fig. 2 is a horizontal sectional view taken on line 2—2 of Fig. 1,

Fig. 3 is an inner side elevation of the tooth with the backing plate removed,

Fig. 4 is a side elevation of the forward side of the backing plate, removed,

Fig. 5 is a central vertical longitudinal sectional view through a slightly different form of tooth embodying the invention, Fig. 6 is a perspective view of the attaching pin, and, Fig. 7 is a similar view with a coacting attaching tube.

In the drawings, wherein for the purpose of illustration is shown a preferred embodiment of my invention, the numeral 10 designates an artificial tooth as a whole, comprising a porcelain tooth or crown element 11. This tooth or crown element preferably has its rear side 12 flat, as clearly indicated in Figs. 1, 2 and 3, while the upper end 13 thereof is inclined.

The numeral 14 designates a flat backing plate, formed of suitable metal, such as platinum. This backing plate is provided at its upper end with an angularly arranged extension or cover 15, fitting over the end 13.

Disposed upon the outer face of the plate 14 and extending longitudinally thereof is an attaching tubular element 16, which is soldered or otherwise rigidly attached to the plate 14. The attaching tubular element 14 is preferably semi-cylindrical and is provided at its lower end with a longitudinal opening 17, extending through the lower end thereof. At the lower end of the attaching tubular element 16 are extensions 18, spaced from the plate 14, as shown.

The tooth or crown element 11 is provided upon its rear side 12 with a longitudinal recess 19, which is semi-cylindrical, and adapted to snugly receive the attaching tubular element 16. At its lower end, the recess 19 has under-cut openings 20, for the reception of the extensions 18.

The numeral 21 designates an attaching pin, provided at its opposite ends with heads 22 and 23. The end of the pin having the head 22 is embedded within the porcelain of the crown 11 and is baked therein, while the crown is being baked. The head 23 of the pin 21 operates within the tubular attaching element 16, the pin 21 operating within the slot 17. The form of tooth herein above described is known as the bridge or plate tooth.

My invention may be also embodied in a rubber or vulcanite tooth as illustrated in Fig. 5. In this figure, the numeral 24 designates a porcelain tooth or crown element, provided with a shoulder 25 and an upper inclined end 26.

The numeral 27 designates a backing plate, provided at its lower end with a flange 28, contacting with the shoulder 25. The backing plate 27 carries an angularly arranged top 29, contacting with the inclined end 26. Secured to the forward side of the backing plate 27 is a tubular attaching element 30, similar to the attaching element 16, but shorter. The tubular attaching element 30 is provided at its lower ends with extensions 31, similar to the extensions 18, and which project into openings in the tooth 24, at the lower end of a recess 32, which receives the tubular attaching element 30. The numeral 33 designates an attaching pin which is identical with the pin 21 and provided at its ends with heads 34 and 35. The head 34 is embedded in the porcelain of the tooth 24 and the head 35 operates within the tubular attaching element 30.

In both forms of teeth, the backing plates are cemented or otherwise securely attached to the backing plates. It is obvious that the attaching means embodying the tubular attaching element and pin form a secure connection between the tooth and backing plate, which will permit of the separation of the tooth or crown element and backing plate, in the event that the tooth element should become broken or injured.

The upper end 15 of the backing plate may be secured to a bridge or other denture, or the same may be equipped with a pin for anchoring with a tooth root, in bridge work.

It is to be understood that the forms of my invention herewith shown and described are to be taken as preferred examples of the same, and that various changes in the shape, size, and arrangement of parts may be resorted to without departing from the spirit of the invention or the scope of the subjoined claims.

Having thus described my invention, what I claim is:

1. A tooth of the character described, comprising a porcelain tooth element provided upon its rear side with a longitudinally extending recess, a double headed pin anchored within the material of the tooth element and having the opposite headed end thereof projecting into the recess, a backing plate, and a tubular attaching element secured to one side of the backing plate and adapted for insertion within the longitudinal recess and having a longitudinal opening for the reception of the pin.

2. A tooth of the character described, comprising a porcelain tooth element having a portion of its rear side substantially flat and provided in the flat portion with a longitudinal recess, a pin having one end thereof embedded within the porcelain tooth element and provided with means to anchor the same therein and its opposite end provided with a head which is arranged within the longitudinal recess, a substantially flat backing plate disposed to contact with the flat portion of the tooth element, a tubular attaching element secured to the substantially flat backing plate and adapted for insertion within the recess and having a longitudinal opening for receiving the pin.

3. A tooth of the character described, comprising a porcelain tooth element provided upon its rear side with a longitudinal substantially semi-cylindrical recess and having openings formed therein at the closed end of the recess, a backing plate, a substantially semi-cylindrical tubular attaching element secured to the backing plate and adapted for insertion within the recess and provided at one end with extensions to enter the openings, said tubular attaching element being provided with a longitudinal slot, and a double headed pin having one end thereof embedded in the porcelain tooth element and its opposite end arranged within the longitudinal recess.

In testimony whereof I affix my signature in presence of two witnesses.

WILLIAM R. PHELPS.

Witnesses:
G. T. REED,
W. S. DAUGHERTY.